W. A. WOODS.
WATER GAGE.
(No Model.)
No. 479,235. Patented July 19, 1892.
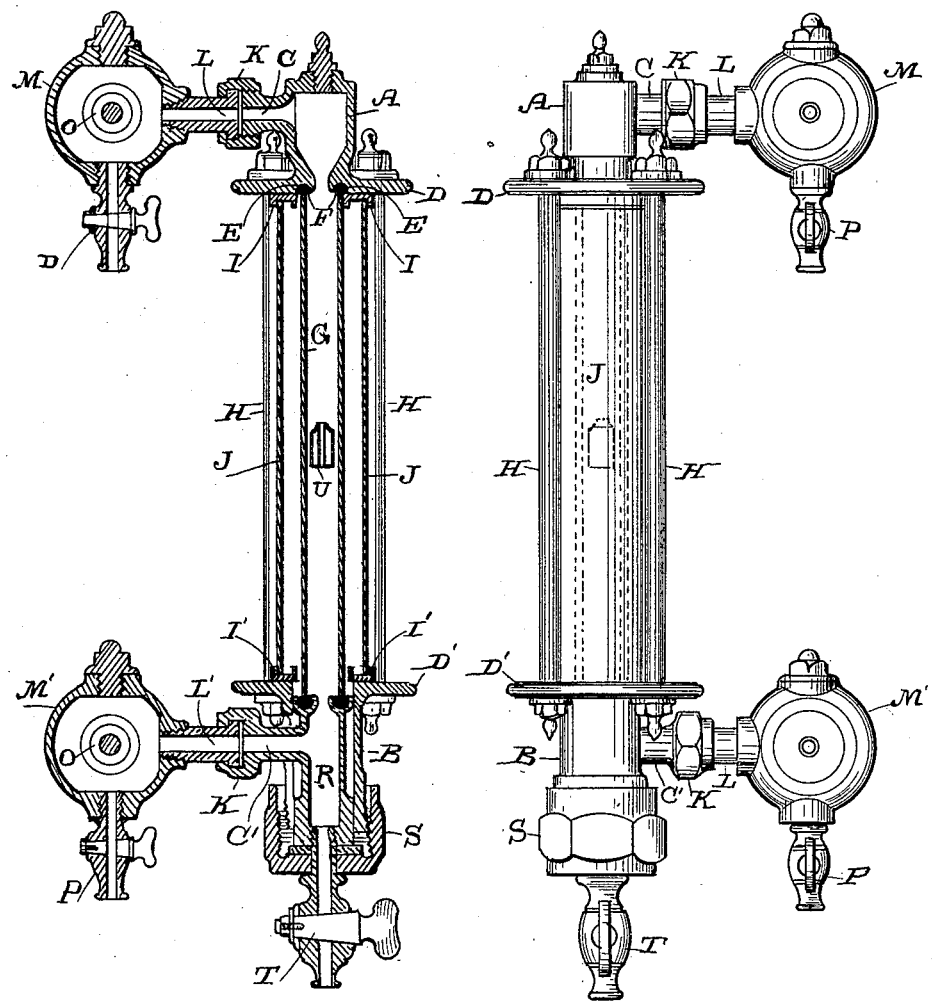
Witnesses:
J. H. House
J. N. Bayless
Inventor,
William A. Woods.
By Dewey & Co.
Att'ys

UNITED STATES PATENT OFFICE.

WILLIAM ALLEN WOODS, OF SAN FRANCISCO, CALIFORNIA.

WATER-GAGE.

SPECIFICATION forming part of Letters Patent No. 479,235, dated July 19, 1892.

Application filed November 9, 1891. Serial No. 411,401. (No model.)

*To all whom it may concern:*

Be it known that I, WILLIAM ALLEN WOODS, a citizen of the United States, residing in the city and county of San Francisco, State of California, have invented an Improvement in Water-Gages for Steam-Boilers; and I hereby declare the following to be a full, clear, and exact description of the same.

My invention relates to certain improvements in water-gages for steam-boilers; and it consists in certain details of construction, which will be more fully explained by reference to the accompanying drawings, in which—

Figure 1 is an exterior view. Fig. 2 is a vertical section taken through the gage. Fig. 3 is a horizontal section of the gage with partial section of one of the couplings by which it is connected with the boiler.

In the usual construction of water-gages a single vertical glass tube has its upper and lower ends connected, respectively, with a chambered metal head, these heads being attached to the boiler above and below the water-line, the glass tube being secured at each end in a stuffing-box to prevent leakage. This construction permits any draft of cold air from the outside to strike the heated glass tube, which is very liable to break, and the connection at the stuffing-boxes is such that the tubes often break, especially at the lower stuffing-box, by reason of the unequal strains, &c.

By my invention I provide a protection for the gage-glass by surrounding it with an exterior tube, with a non-conducting column of air between them.

In my invention A and B are the upper and lower metal heads having chambers in them, which connect with horizontal passages C, formed in tubular extensions, which are coupled to valve-chambers, and these latter are connected directly with the boiler, as hereinafter described.

D D' are circular disks upon the adjacent ends of the heads A and B, facing each other, and the upper disk D has a grooved channel E formed in it to receive a packing material or washer F. Within this groove the inner glass tube G has its upper end fitted against the packing material. By means of the rods H passing through the disks D and having nuts upon their ends the two disks D and D' are drawn toward each other and held together.

I I' are annular channeled disks fitting upon the faces of the disks D and D' exterior to the inner gage-tube G, as shown, and to receive an exterior glass tube J. This tube is put into place before the inner tube is introduced by simply removing one of the rods connecting the two disks D D', thus leaving a sufficient space to allow the tube and the independent disks I I' to be slipped out or introduced.

The upper passage C connects with the chamber in the head A and extends horizontally at right angles from it. The tubular extension is screw-threaded at the outer end, and by means of the coupling K the tube L and the valve-chamber M are connected with the gage.

The valve-chambers M and M' have the screw-threaded projections N, by which they are connected with the boiler or other chamber, one above and the other below the water-level, and they are provided with the valves O, by which connection with the gage may be cut off at any time when it is necessary to remove the glass tubes or make any changes in the exterior portions.

P P are blow-off cocks, by which the water or steam or any sediment which may collect within the valve-chambers may be discharged at any time.

The annular channel at the lower end, in which the bottom of the interior glass tube G is supported, is formed in the upper end of an independent chamber or tube R, and this independent tubular piece is held in place by a cap S, screwing onto the bottom of the chamber B, with a suitable elastic washer to allow for expansion or slight variation in length of tubes. The side of the chamber B is slotted, so that the chamber R, with the extension C', may be introduced or removed through the bottom. The passage C' communicates through the interior of the chamber R and thence with the interior of the inner glass tube. The bottom of the tube R connects with a blow-off cock T, through which any sediment that may collect in the interior tube G or in the chamber of the tube R may be blown out from time to time.

When the upper and lower heads M M' are connected with the boiler and in position, the glass tubes may be introduced as follows: One of the rods H, which connect the two disks D, is removed. The outer glass tube J and the annular channeled disks I I', into which the ends are fitted, are then slipped in between the two disks D. The inner glass tube G is then slipped up within the outer one, and the tube R is inserted so that when the upper end of the inner glass tube fits against the top washer F the chamber R is introduced into the lower chamber B until the annular groove and the washer at the upper end of the chamber R press against the bottom of the inner tube G. The horizontal tubular portion C' projects outward through the slot in the side of B, as before described, and when the retaining-cap S is screwed into place the parts will be in position. The rod H connecting the disks is then introduced and screwed up and the whole is thus held together. Sufficient space is allowed between the inner tube and the annular disk I', which holds the lower end of the outer glass tube, to allow any water of condensation to pass down between them and thence escape through the open slot at the side of the chamber B.

In order to render the position of the water within the gage-tube prominently noticeable, I have shown a float U, which is preferably made of light spun brass, and it has a hole made centrally through it from top to bottom. The annular chamber exterior to this hole is of sufficient area to cause the float to remain upon the surface of the water in the tube and move up and down with it, while the central opening is of sufficient size to allow steam and water to flow through it whenever the blow-off cock at the bottom is open for the purpose of cleaning the interior.

This gage is so arranged that it may be used upon either side, projecting either to the right or left of the parts which connect it with the boiler. This is effected by simply turning the valve-chambers a half-revolution around the horizontal connecting-passages C, so that the hand-wheels of the valve will project to the opposite side from that shown. The blow-off cock at the bottom is then removed and the screw-cap, which is now shown at the top, will be introduced in the position of the blow-off cock and the blow-off cock will replace the screw-cap, the two being interchangeable, so that when the device has been turned around, as above described, the blow-off cock will still remain at the bottom and the screw-cap will close the top.

Having thus described my invention, what I claim as new, and desire to secure by Letters Patent, is—

1. In a water-gage, the top and bottom chambers having grooved seats on their inner faces, in combination with concentric glass tubes having their opposite ends seated in the grooved seats of the chambers to form tight joints, substantially as herein described.

2. In a water-gage, the top and bottom chambers facing each other, an annular groove in the face of the upper chamber, and a supplemental removable chamber fitting the lower chamber below its face, having an annular groove in its upper edge, packing-washers fitting said grooves, adapted to receive the ends of the tube, and a screw-cap by which the lower supplemental chamber is pressed against the end of the tube, so as to form tight joints at both ends without the use of stuffing-boxes, substantially as herein described.

3. In a water-gage, the chambers A and B, disks formed upon the adjacent faces of these chambers, an annular groove with packing-collar in the lower face of the upper disk, a removable tubular chamber having a corresponding annular groove and packing-washer to receive the lower end of the tube, a slot formed in the side of the chamber B, through which the horizontal tubular passage C projects, and a cap screwing upon the bottom of the chamber B to retain the inner supplemental tubular chamber in place and force it against the bottom of the gage-tube, said inner chamber and tube being removable when the cap has been removed, substantially as herein described.

4. In a water-gage, the chambers A and B, having the confronting faces, an annular groove and packing-collar formed in the face of the upper chamber, a supplemental tubular chamber movable in the chamber B beneath the lower face, having an annular groove and packing-collar, a glass gage-tube the ends of which abut against the packing-collars in the upper and lower grooves, annular grooved disks surrounding the upper and lower ends of the glass gage-tube and abutting upon the faces of the chambers A and B, and an exterior glass tube concentric with the inner one, having its ends fitting the annular movable disks with washers, whereby tight joints are made at the ends, substantially as herein described.

5. A water-gage consisting of the inner and outer concentric glass tubes, chambers with annular grooves and packing-collars, a means for pressing the ends of the tubes against the packing-collars to prevent leakage, a supplemental tubular chamber having an annular groove at the upper end in which the lower end of the inner gage-tube is supported and a cap by which it is held in position from below, and a passage and a cock connecting with the interior of said supplemental chamber, whereby the tube may be blown out and cleaned, substantially as herein described.

6. In a water-gage, the inner and outer glass tubes, the chambers at the upper and lower ends connected with the boiler and facing each other, with annular grooves and packing-collars to receive the ends of the tubes, a means for forcing them into contact with the packing-collars to prevent leakage, a blow-off cock and passage connecting with the inner tube, and an exterior passage connecting the outer tube with the lower exterior chamber, substantially as herein described.

7. In a water-gage, the tubular concentric glasses, the chambered heads with annular grooves, packing-collars between which the ends of the tubes are retained and a tight joint made without stuffing-boxes, horizontally-projecting tubes and couplings whereby the chambered heads are connected with valve-chambers, which in turn are connected with the boiler, blow-off cocks at the lower sides of said valve-chambers, and corresponding screw-threaded caps fitted to the opposite sides, said caps and cocks being interchangeable, whereby the position of the valve may be reversed and the gage used either as a left or right hand gage, substantially as herein described.

8. In a water-gage, the interior and exterior concentric glass tubes, chambered metallic heads with annular grooved channels and packing-collars against which the ends of the tubes abut, and means for clamping the tubes against the collars to make tight joints without stuffing-boxes, and an annular chambered float fitting the inner tube and the discharge passes vertically through its center, substantially as herein described.

In witness whereof I have hereunto set my hand.

WILLIAM ALLEN WOODS.

Witnesses:
FERRIS JOHN MIDDLETON,
WILLIAM GEE.